US012808250B2

(12) United States Patent
De Nuntiis et al.

(10) Patent No.: US 12,808,250 B2
(45) Date of Patent: Nov. 24, 2026

(54) ELECTRICAL SYSTEM FOR OPENING A WINDOW AND MOTOR VEHICLE

(71) Applicant: M.D.N. SURGERY S.R.L., Rome (IT)

(72) Inventors: Michele De Nuntiis, Rome (IT); Marcello De Nuntis, Rome (IT)

(73) Assignee: M.D.N. SURGERY S.R.L., Rome (IT)

( * ) Notice: Subject to any disclaimer, the term of this patent is extended or adjusted under 35 U.S.C. 154(b) by 0 days.

(21) Appl. No.: 19/182,167

(22) Filed: Apr. 17, 2025

(65) Prior Publication Data

US 2025/0333995 A1 Oct. 30, 2025

(30) Foreign Application Priority Data

Apr. 29, 2024 (IT) ........................ 102024000009601

(51) Int. Cl.
*E05F 15/695* (2015.01)

(52) U.S. Cl.
CPC ....... *E05F 15/695* (2015.01); *E05Y 2800/252* (2013.01); *E05Y 2800/428* (2013.01); *E05Y 2900/55* (2013.01)

(58) Field of Classification Search
None
See application file for complete search history.

(56) References Cited

U.S. PATENT DOCUMENTS 5,547,208 A * 8/1996 Chappell ................ E05B 81/82 180/281
6,081,085 A * 6/2000 Ohashi .................. E05F 15/695 318/266
6,483,267 B1 11/2002 Jurney
(Continued)

FOREIGN PATENT DOCUMENTS

DE 10113796 A1 * 9/2001 .............. E05F 15/40
DE 69822412 T2 * 3/2005 ............ E05F 15/695
(Continued)

OTHER PUBLICATIONS

Translated DE 102015014055 (Year: 2015).*
(Continued)

*Primary Examiner* — Catherine A Kelly
(74) *Attorney, Agent, or Firm* — NIXON & VANDERHYE

(57) ABSTRACT

Described is an electrical system (1) for opening a window (2) comprising a window winder device (3) for moving a window (2) of a motor vehicle being raised and/or lowered, and an electrical control unit (4). The electrical opening system (1) also comprises an emergency system comprising a watertight electric motor (5), an auxiliary watertight battery (6) and a watertight electric switch (7). The electric switch (7) is configured for switching said electrical opening system (1) at least in two operating configurations. In the first operating configuration the electric switch (7) allows the operation of said window winder device (3) with the aid of said electrical control unit (4). In the second operating configuration the electric switch (7) places the auxiliary battery (6) and the electric motor (5) in communication in such a way that said electric motor (5) commands by means of the window winder device (3) an automated lowering of the window (2).

9 Claims, 1 Drawing Sheet

(56) References Cited

U.S. PATENT DOCUMENTS

| | | | | |
|---|---|---|---|---|
| 7,784,578 | B2 * | 8/2010 | Cantu | E05F 15/72 701/45 |
| 7,861,460 | B1 * | 1/2011 | Costello | E05F 15/697 180/281 |
| 8,827,027 | B2 * | 9/2014 | Syvret | E05F 15/70 180/289 |

FOREIGN PATENT DOCUMENTS

| | | | | | |
|---|---|---|---|---|---|
| DE | 102015014055 | A1 | * | 4/2016 | E05F 15/695 |
| DE | 102018101033 | A1 | * | 7/2019 | B60R 22/48 |
| JP | 2021147786 | A | * | 9/2021 | |
| KR | 20090007503 | U | | 7/2009 | |

OTHER PUBLICATIONS

Translated JP 2021147786 (Year: 2021).*

Italian Search Report for IT202400009601 dated Oct. 1, 2024, 9 pages.

Extended European Search Report, issued in European Patent Application No. 25169399.0 dated Aug. 5, 2025.

* cited by examiner

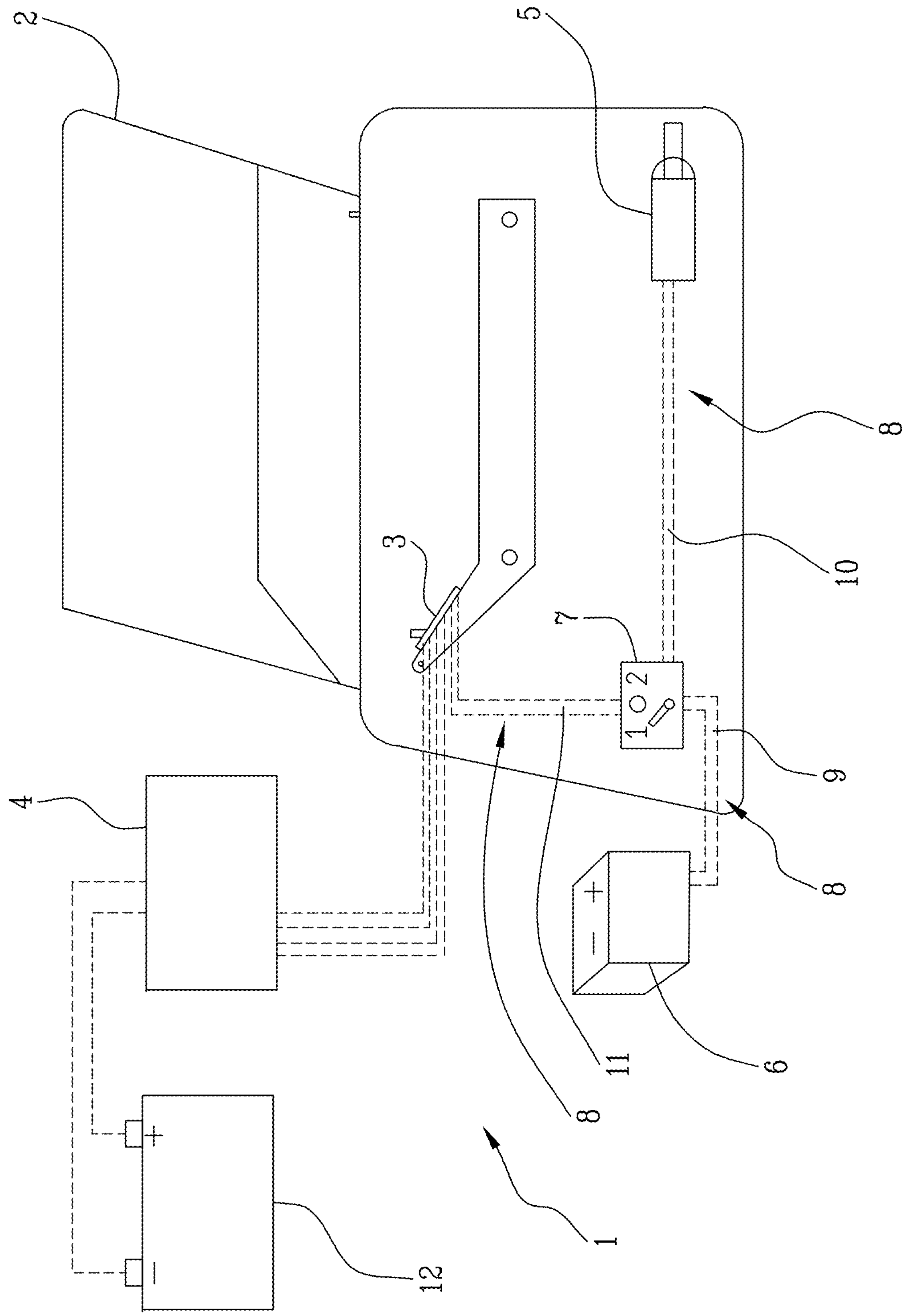
2
5
8
3
10
7
1
2
9
4
8
6
11
8
12
1

ELECTRICAL SYSTEM FOR OPENING A WINDOW AND MOTOR VEHICLE

This application claims priority to IT 102024000009601 filed Apr. 29, 2024, the entire contents of which are hereby incorporated by reference.

This invention relates to an electrical system for opening a window of a motor vehicle.

The invention also relates to a motor vehicle comprising the above-mentioned electrical opening system.

In other words, this invention addresses the sector of devices for automated opening of windows, in particular side windows, in the automotive sector or other similar sectors.

Currently, almost all of motor vehicles are provided with electric window winder systems whose operation is controlled by the electrical control unit of the vehicle and wherein the entire system is directly powered by the battery of the motor vehicle. In increasingly limited cases, older vehicles are provided with manually operated systems for raising the side windows, such as, for example, crank actuators.

Disadvantageously, any malfunction of the battery of the motor vehicle or any anomaly in the operation of the electrical system may cause a malfunction of the electrical window winder device, resulting in a blocking of the windows with the creation of possible dangerous situations for passengers of the motor vehicle. In other words, the malfunction of the electrical window winder system due to problems relating to the power supply system or the electrical control system may create significant dangerous situations.

For example, following road accidents which carry the vehicle into a body of water, the blocking of the windows due to a malfunction of the electrical system may result in the risk of drowning. In particular, the water entering the automobile could result in a short-circuit of the electrical system (for example, of the electrical control unit of the window winder device) which would therefore not be able to actuate the window winder device and therefore open the window by the user to enable escape. Furthermore, the blockage of the windows and therefore a difficult access to the cabin of the vehicle following road accidents may lead to delays in the rescue of passengers with potentially serious consequences. In particular, where the passenger is conscious and needs to escape from a n automobile, if the electrical control unit had suffered mechanical damage it would no longer be possible to open the window, requiring external intervention by first responders.

In other words, in the event of mechanical or electrical faults to the control unit of the window winder device there is the risk that the window winder device does not operate correctly, therefore resulting in the window not opening.

The technical purpose of the invention is therefore to provide an electrical system for opening a window and a motor vehicle which are able to overcome the drawbacks of the prior art.

The aim of the invention is therefore to provide an electrical system for opening a window and a motor vehicle which allow the window to be lowered in situations of malfunction of the electrical system of the motor vehicle.

A further aim of the invention is to provide an electrical system for opening a window and a motor vehicle which, in emergency conditions, allows the opening of the window to prevent the creation of possible serious situations of danger for the passengers.

The technical purpose indicated and the aims specified are substantially achieved by an electrical system for opening a window and a motor vehicle comprising the technical features described in one or more of the appended claims. The dependent claims correspond to possible embodiments of the invention.

Further features and advantages of the invention are more apparent in the non-limiting description which follows of an electrical system for opening a window and a motor vehicle.

The description is set out below with reference to the accompanying drawing, which is provided solely for purposes of illustration without restricting the scope of the invention and in which:

FIG. 1 shows a schematic view of the entire electrical system for opening a window of an automobile according to the invention.

With reference to the accompanying drawing, the numeral 1 denotes the electrical system for opening the window in its entirety which, in the context of this description, will be referred to as "electrical opening system 1".

The electrical system 1 for opening a window 2 comprises a window winder device 3, designed for moving the window 2 of a motor vehicle by raising and/or lowering, and an electrical control unit 4, operatively connected to the window winder device 3 and configured for operating the window winder device for raising and/or lowering the window 2. The raising or lowering of the window 2 may be performed at different heights relative to the overall stroke of the window 2 between a closed configuration wherein the window 2 is completely raised and an open configuration wherein the window 2 is completely lowered.

The electrical opening system 1 also comprises an emergency system comprising an electric motor 5, an auxiliary battery 6 and an electric switch 7.

The electric motor 5 is watertight and can be connected to the window winder device 3 for automatically controlling the lowering of the window 2.

The auxiliary battery 6 is also watertight and is configured to power the watertight electric motor 5.

The electric switch 7, which is also watertight, for controlling the electrical system 1 for opening the window 2 is configured for switching the electrical opening system 1 to at least two operating configurations.

Advantageously, the fact that the electric motor 5, the auxiliary battery 6 and the electric switch 7 are watertight guarantees that, even in the case of infiltrations of water into the emergency system, their impermeability, and therefore their correct operation, is guaranteed.

In other words, the resistance to immersion in water of the electric motor 5, of the auxiliary battery 6 and of the electric switch 7 allows the correct operation of the emergency electrical opening system 1, that is to say, it guarantees the emergency lowering of the window 2 even if the operation of the electrical system of the vehicle is compromised due to the direct contact of the electrical opening system 1 with the water. For example, in the case of a road accident in which the motor vehicle finishes underwater, the opening of the side windows will be guaranteed by the presence of the emergency electrical system 1 for opening the window 2. In this way the blocking of the side windows is avoided and the escape of the passengers from the vehicle is facilitated, since the doors of the car could also be locked following malfunctions of the electrical system or due to the pressure exerted by the water.

In the first operating configuration, the electric switch 7 allows the operation of the window winder device 3 with the aid of the electrical control unit 4.

In the second operating configuration, on the other hand, the electric switch 7 places the auxiliary battery 6 and the electric motor 5 in communication, in such a way that the electric motor 5 commands a lowering of the window 2 by means of the window winder device 3.

In other words, the first operating configuration corresponds to the normal operation of the window winder device, wherein the power supply is provided by the battery 12 of the vehicle. The second operating configuration corresponds, on the other hand, to the emergency lowering function of the window 2, wherein the electric motor 5 is powered by the auxiliary battery 6.

Advantageously, providing the presence of an electric motor 5 and an auxiliary emergency battery 6 guarantees the possibility of lowering the window 2 even in emergency situations in which it is possible that a malfunction of the electrical system occurs.

Further, the electric switch 7 may be configured for switching the electrical opening system 1 to a third operating configuration, wherein the window winder device 3 is disconnected from the electrical control unit 4 and from the electric motor 5. In other words, in the third operating configuration, the functions of the window winder device 3 are deactivated. The third operating configuration advantageously prevents the undesired consumption of the charge of the auxiliary battery 6. In effect, where the window 2 is opened completely, and therefore brought to the open configuration, the electric switch 7 can be moved manually or automatically to define the third configuration.

Advantageously, the electric switch 7 may or may not be equipped with a mechanism which prevents the locking of the electric switch 7 on the second operating configuration, automatically returning the system to the third operating configuration, wherein all the functions of the electrical opening system 1 are excluded. In other words, the electric switch 7 may be provided with a mechanism which allows the choice of actuating the emergency electrical opening system 1 for lowering the window 2 and which, automatically, returns the electric switch 7 to a condition in which the functions of the system are excluded, that is to say, in the third operating configuration.

Advantageously, in this way the emergency system can be operated only when necessary by the user in the case of an emergency and at the same time the auxiliary battery 6 will be used to power the electrical opening system 1 only for the short period useful for lowering the window 2 in emergency conditions. In this way, the charge of the auxiliary battery 6 will be preserved and the electrical opening system 1 in the second emergency operating configuration may also be re-used in future times without the need to change components following a first use or in any case without the need to continuously recharge the auxiliary battery 6.

According to an embodiment, the electric switch 7 comprises a lighting system configured to illuminate the electric switch 7. In other words, the electric switch 7, through which the operating configuration of the electrical system 1 for opening the window 2 is selected, is provided with a lighting system aimed at making the positioning of the electric switch 7 easily identifiable to the user or to the passenger. Advantageously, the lighting system facilitates the identification of the electric switch 7 in situations in which the visual powers of the user are limited, that is to say, in the absence of light, underwater or in emergency situations.

Preferably, the auxiliary battery 6 is a 12 volt battery with an amperage of between 2 amperes and 8 amperes. According to an embodiment, the auxiliary battery 6 is a 12 volt battery with an amperage of 2 amperes. Alternatively, the auxiliary battery 6 is a 12 volt battery with an amperage of 8 amperes.

These features give the battery a compactness and lightness and therefore allow the user to select a small size auxiliary watertight battery 6 which can be housed in the storage compartment of the door, in the door or in any other part of the motor vehicle.

In order to guarantee the operation of the electrical system 1 for opening the window 2 even under conditions of contact of the entire electrical system with water, it is advantageously envisaged that watertight electrical cables 8 are used for the connection between the electric switch 7 to the window winder device 3, to the electric motor 5 and to the auxiliary battery 6.

According to a preferred, non-limiting embodiment, the watertight electrical cables 8 are made in the form of rubberized electrical cables 8.

Advantageously, the watertight seal of the electrical cables 8, that is to say, the rubberized wiring, makes the electrical cables of the electrical opening system 1 impermeable and protects them from corrosion, preserving the functionality of the system for moving the window 2 in emergency situations.

In particular, a first rubberized electric cable 9 connects the electric switch 7 to the auxiliary battery 6, a second rubberized electric cable 10 connects the electric switch 7 to the electric motor 5 and a third rubberized electric cable 11 connects the electric switch to the window winder device 3.

Preferably, the third rubberized electric cable 11 is provided with a device for protecting it against short-circuits. In particular, according to an embodiment, the third electric cable 11 is provided with one or more fuses. Advantageously, according to this embodiment, the presence of one or more devices for protection against short-circuits guarantees the continuity of service of the electrical system 1 for opening the window 2, preventing the functionality of the system from being compromised by damage of an electrical nature. Advantageously, the protection against short-circuits is further provided by the rubber cover provided for the electrical cables 8 for connection between the devices. Thus, the third electric cable 11 has dual protection against a short-circuit.

Preferably, for raising and/or lowering the window 2, the electrical control unit 4 comprises a user interface device through which it is possible to control the window winder device 3. Preferably, the user interface device is a button, which can be operated directly by the user.

This invention also relates to a motor vehicle comprising a plurality of windows 2 and at least one electrical opening system 1 as described above.

According to an embodiment, the electrical opening system 1 described above may be used for controlling a single window 2. For this reason, according to this embodiment each window 2 is associated with a respective electrical opening system 1.

Alternatively, according to a further embodiment, the electrical opening system 1 (and in particular the emergency system) may be centralised and through it it is possible to control the emergency lowering of the plurality of windows 2 which the motor vehicle is equipped with.

Advantageously, the invention is able to overcome the drawbacks of the prior art. Advantageously, the electrical system 1 for opening a window 2 guarantees the possibility of lowering the window 2 of an automobile under malfunctioning conditions of the electrical system, thereby preventing these from blocking and causing consequent potential serious situations of danger for the passengers. In other words, the electrical opening system 1 according to this invention guarantees the opening of the window 2 in emergency situations guaranteeing the possible escape of the passenger from the motor vehicle.

The invention claimed is:

1. An electrical opening system (1) for opening a window (2) comprising:

a window winder device (3) for moving a window (2) of a motor vehicle being raised and/or lowered;

an electrical control unit (4) operatively connected to said window winder device (3) and configured in use to operate said window winder device (3) for raising and/or lowering said window;

wherein said electrical system (1) further comprises an emergency system comprising:

a watertight window winder device electric motor (5) connectable to said window winder device (3) for controlling an automated lowering of said window;

a watertight auxiliary battery (6) configured to power said watertight electric motor (5);

a watertight electric switch (7) for controlling said electrical system (1) for opening a window (2) and configured for switching said electrical system (1) to at least two operating configurations:

a first operating configuration wherein said electric switch (7) allows the operation of said window winder device (3) with the aid of said electrical control unit (4);

a second operating configuration wherein the electric switch (7) places said auxiliary battery (6) and said electric motor (5) in communication in such a way that said electric motor (5) commands by means of said window winder device (3) an automated lowering of said window (2); and a third operating configuration wherein said window winder device (3) is disconnected from said electrical control unit (4) and from said electric motor (5).

2. The electrical opening system according to claim 1, wherein said electric switch (7) comprises a lighting system configured to illuminate said electric switch (7).

3. The electrical opening system (1) according to claim 1, wherein said auxiliary battery (6) is a 12 volt battery with an amperage of between 2 amperes and 8 amperes.

4. The electrical opening system (1) according to claim 1, wherein said electric switch (7) is connected to said window winder device (3), to said auxiliary battery (6) and to said electric motor (5) by means of respective watertight electrical cables (8).

5. The electrical opening system (1) according to claim 4, wherein said watertight electrical cables (8) comprise at least:

a first rubberised electrical cable (9) for connecting said electric switch (7) to said auxiliary battery (6);

a second rubberised electrical cable (10) for connecting said electric switch (7) to said electric motor (5);

a third rubberised electrical cable (11) for connecting said electric switch (7) to said window winder device (3).

6. The electrical opening system (1) according to claim 5, wherein said third rubberised electrical cable (11) comprises a device for protection against short-circuits.

7. The electrical opening system (1) according to claim 5, wherein said third rubberised electrical cable (11) comprises one or more short-circuit protection fuses.

8. The electrical opening system (1) according to claim 1, wherein said electrical control unit (4) comprises a user interface device, which can be actuated by a user for controlling said window winder device (3) for raising and/or lowering the window (2).

9. A motor vehicle comprising:

a plurality of windows including said window (2);

at least one said electrical opening system (1) according to claim 1, configured to control the opening of one or more of said plurality of windows.

* * * * *